(12) United States Patent
Eum et al.

(10) Patent No.: US 10,999,905 B2
(45) Date of Patent: May 4, 2021

(54) CURRENT CONTROL FOR POWER CONVERTER

(71) Applicant: SEMICONDUCTOR COMPONENTS INDUSTRIES, LLC, Phoenix, AZ (US)

(72) Inventors: Hyunchul Eum, Seoul (KR); Gyumin Park, Seoul (KR); Minha Hwang, Seoul (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/787,343

(22) Filed: Feb. 11, 2020

(65) Prior Publication Data

US 2020/0404755 A1 Dec. 24, 2020

Related U.S. Application Data

(60) Provisional application No. 62/863,189, filed on Jun. 18, 2019.

(51) Int. Cl.
| | |
|---|---|
| *H05B 45/10* | (2020.01) |
| *H05B 45/325* | (2020.01) |
| *H05B 45/38* | (2020.01) |
| *H05B 45/375* | (2020.01) |
| *H05B 45/385* | (2020.01) |
| *H05B 45/355* | (2020.01) |
| *H02M 3/156* | (2006.01) |
| *H02M 1/08* | (2006.01) |

(52) U.S. Cl.
CPC ........... *H05B 45/10* (2020.01); *H05B 45/325* (2020.01); *H05B 45/375* (2020.01); *H05B 45/38* (2020.01); *H05B 45/355* (2020.01); *H05B 45/385* (2020.01)

(58) Field of Classification Search
CPC ...... H05B 45/10; H05B 45/325; H05B 45/38; H05B 45/375; H05B 45/385; H05B 45/355
USPC .................. 315/186, 224; 323/271, 282, 283
See application file for complete search history.

(56) References Cited

U.S. PATENT DOCUMENTS

2011/0018507 A1* 1/2011 McCloy-Stevens ........................ H02M 3/1588 323/271
2012/0069611 A1* 3/2012 Yang .................... H02M 1/4225 363/44

(Continued)

OTHER PUBLICATIONS

STMicroelectronics, "Digital combo multi-mode PFC and time-shift LLC resonant controller," Mar. 2018.

*Primary Examiner* — Wei (Victor) Y Chan
(74) *Attorney, Agent, or Firm* — Brake Hughes Bellermann LLP

(57) ABSTRACT

The present disclosure is related to accurate analog dimming of a light emitting diode (LED). Accurate dimming can require precise control of a power converter that supplies the LED with a current. The precise control relies on accurately sensing a level of the LED. When the power converter operates in a discontinuous conduction mode (DCM), for example at a low dimming ratio, the accuracy of the sensed LED-level can be affected by a resonant current offset, resulting from current ringing in the power converter. The disclosed circuits and methods provide accurate control of the LED-level by compensating for the resonant current offset in the sensed LED-level.

9 Claims, 15 Drawing Sheets

(56) References Cited

U.S. PATENT DOCUMENTS

| | | | |
|---|---|---|---|
| 2013/0194842 A1 | 8/2013 | Bianco et al. | |
| 2015/0137776 A1* | 5/2015 | Thomas | H02M 3/1588 323/271 |
| 2016/0226239 A1* | 8/2016 | Yang | H02M 1/32 |
| 2018/0337599 A1* | 11/2018 | Chen | H02M 3/158 |

* cited by examiner

CURRENT CONTROL FOR POWER CONVERTER

RELATED APPLICATION

This application claims priority to and the benefit of U.S. Provisional Application No. 62/863,189, filed on Jun. 18, 2019, which is incorporated by reference herein in its entirety.

FIELD OF THE DISCLOSURE

The present disclosure relates to feedback control of a power converter circuit (i.e., converter circuit) that is based on a load-level measurement and more specifically to a circuit and method to correct (i.e. compensate) the load-level measurement for a resonant current, which results when the converter circuit is operated in a discontinuous current mode (DCM).

BACKGROUND

Advances in light emitting diode (LED) technology have made replacing traditional lighting a choice for consumers. Added lighting features, such as dimming, may desirable if the dimming can be carried out over a wide range without changing the quality of the or causing other notable artifacts. Dimming the LED may be achieved using a switched approach (i.e., PWM dimming) or an analog approach (i.e., analog dimming). In analog diming, a constant current through the LED is adjusted to increase or decrease the LED's light intensity. Analog dimming may reduce or eliminate some drawbacks associated with the switched approach, such as noticeable audible noise associated the switching or a flicker in the light that is noticeable by eye or by video recording equipment. Analog dimming, however, faces challenges with providing a wide dimming range over which the LED's light intensity can be accurately controlled. It is in this context that implementations of the disclosure arise.

SUMMARY

In at least one aspect, the present disclosure generally describes a system (e.g., an LED system). The system includes a converter circuit (e.g., a buck converter circuit) that is configured to generate a current or a voltage based on a pulse width modulated signal (i.e., PWM signal), in which each cycle of the PWM signal include an ON portion and an OFF portion according to a duty cycle of the PWM signal. The system further includes a load (e.g., an LED) that is configured to receive the current or the voltage generated by the converter circuit, a level of the current or the voltage generated by the converter circuit corresponds to the duty cycle of the PWM signal. The system further includes a controller (e.g., a current controller) that is configured to adjust the duty cycle of the PWM signal according to a comparison between a reference level and a load level (e.g., an LED-level), which corresponds to a measurement of the load-level. The measurement of the load-level includes a compensation period to correct for an offset between the PWM signal and a current-sense signal (corresponding to a current through a transistor of the converter circuit) during the ON portion of the PWM signal.

In at least one other aspect, the present disclosure generally describes a controller for a buck converter. The controller includes duty generation circuit that is configured to generate a pulse width modulated (PWM) signal that configures the buck converter to supply a current to a load coupled to the buck converter. The level of the current corresponds to a duty cycle of the PWM signal. The controller for the buck converter further includes a measurement circuit that is coupled to the duty generation circuit and is configured to determine a load. The determination is based on a current-sense signal, the PWM signal and a compensation period. The compensation period corresponds to an offset between the PWM signal and the current-sense when the buck converter is operated in a discontinuous conduction mode (DCM).

In at least on other aspect, the present disclosure generally describes a method for driving an LED. The method includes detecting a pulse width modulated (PWM) signal including PWM cycles. Each PWM cycle includes an ON portion and an OFF portion. The method further includes detecting, during the ON portion, a current-sense signal that corresponds to the LED current and that increases during the ON portion. The method further includes determining a compensation time that is related to an offset between a start time of the ON portion of the PWM cycle and a time at which the current-sense signal increase above zero. The method father includes determining a current-sense voltage (e.g., half-peak current-sense voltage) by sampling the current-sense signal at a time that is adjusted by the compensation time. The method further includes detecting, during the OFF portion, a drain voltage that corresponds to the LED current and that decreases during the OFF portion. The method further includes determining a discharge time that is related to a period between a start time of the OFF portion of the PWM cycle and a time at which the drain voltage decreases to zero. The method further includes determining a conduction time of the LED based on a time of the ON portion, the discharge time, and the compensation time. The method further includes multiplying the current-sense voltage (e.g., half-peak current-sense voltage) and the conduction time to determine an LED-level. The method further includes comparing the LED-level to a reference level, adjusting a duty cycle of the PWM signal, and applying the PWM signal to a buck converter that drives the LED.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

The present disclosure describes a circuit and method for controlling a converter circuit accurately, especially when the converter circuit is operated in a discontinuous current mode (DCM) to deliver a current or a voltage to a load. The disclosed circuit and method may be implemented for an analog dimming of an LED and can address a problem of the lack of precise dimming control at low light levels of an LED. The disclosed circuit and method may provide the advantageous results of extending a controllable range of an LED light level without using pulsed dimming, which can have unwanted flicker or noise.

Figure 1:
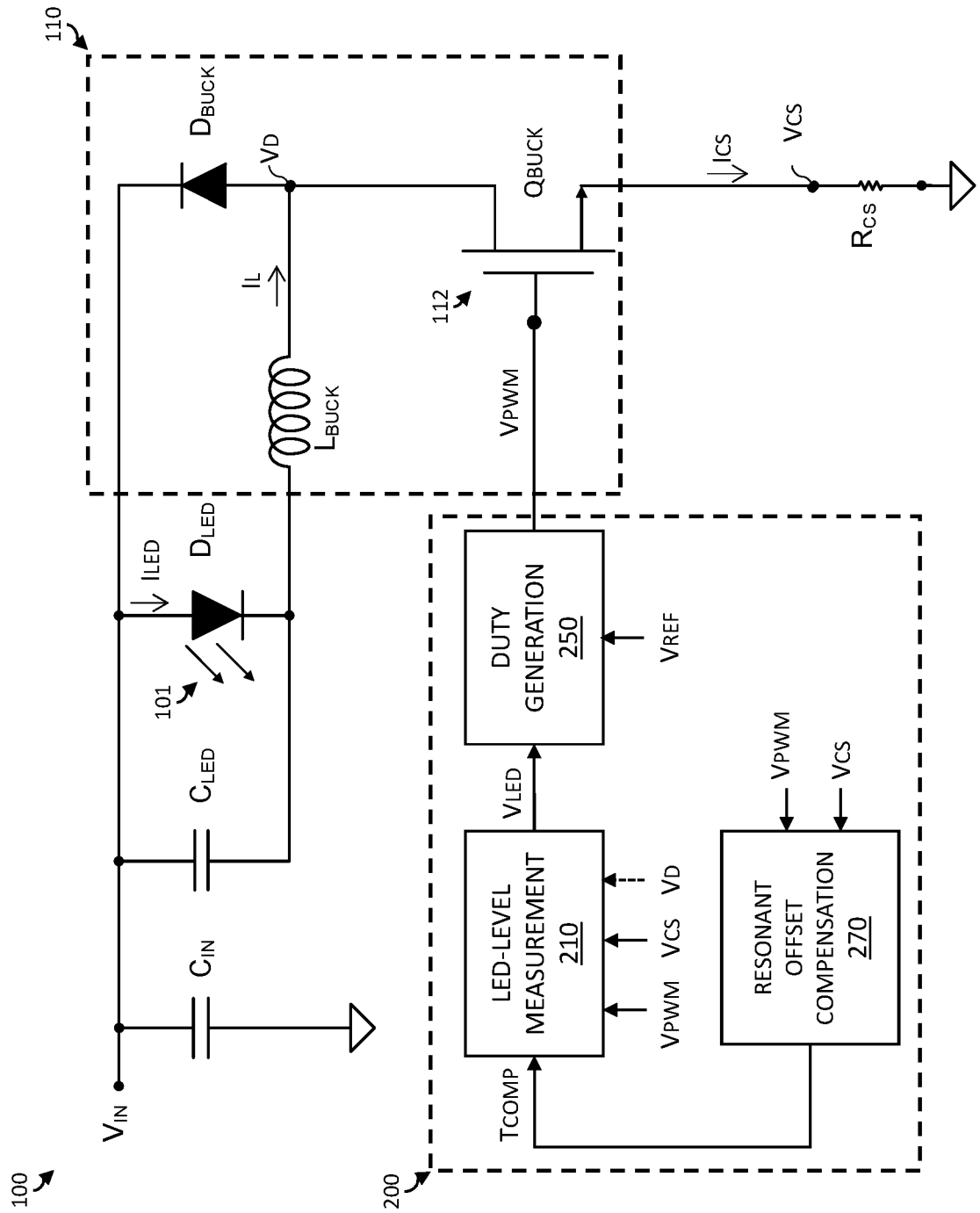
FIG. 1 is a block diagram of an LED system with dimming control according to an implementation of the present disclosure.

Analog dimming uses direct control of the current level through the LED to adjust its brightness (i.e., level). FIG. 1 is a block diagram of an LED system with dimming control. In the system 100, an LED diode ($D_{LED}$) is powered using an asynchronous (single switch) switch-mode DC-to-DC converter. As shown, the converter may be implemented as a buck converter circuit 110 (i.e., buck converter). The concepts described herein can also be implemented in a boost converter circuit or a buck-boost converter circuit.

The buck converter 110 may include a switch (e.g., a transistor, $Q_{BUCK}$), an inductor ($L_{BUCK}$), and a diode ($D_{BUCK}$). The buck converter 110 is configured to receive an input voltage ($V_{IN}$) and to output a substantially constant current ($I_L$) to a load. For example, the buck converter outputs a substantially constant current to the LED diode so that the LED produces light of a particular brightness. To adjust the current (i.e., the brightness), a pulse width modulated signal (i.e., PWM signal, ($V_{PWM}$)) is applied to a controlling (e.g., gate) terminal of a transistor ($Q_{BUCK}$) to cycle the transistor ON and OFF. The PWM signal ($V_{PWM}$) has a duty cycle defined by the percentage of time that the transistor is ON (i.e., conducting) versus the total time of an ON/OFF cycle (i.e., period). When the transistor ($Q_{BUCK}$) is ON, the input voltage induces a current ($I_L$) is flow through the LED ($D_{LED}$) and the inductor ($L_{BUCK}$) to ground by the conducting transistor ($Q_{BUCK}$). When the transistor ($Q_{BUCK}$) is OFF, the charged inductor ($L_{BUCK}$) maintains the current ($I_L$) flowing through the buck converter diode ($D_{BUCK}$). In this way, a nearly constant current through the LED may be maintained. By adjusting the duty cycle of the PWM signal ($V_{PWM}$) the brightness of the LED ($D_{LED}$) may be controlled. Additionally, an LED capacitor ($C_{LED}$) may be included to minimize a current ripple between the ON/OFF states of the circuit. Additionally, an input capacitor ($C_{IN}$) may be included to minimize high frequency noise on the input voltage ($V_{IN}$).

To maintain or adjust the level of the LED (e.g., the light 101 from the LED), the system includes a current controller 200 (i.e., controller). The controller includes a load-level measurement circuit (e.g., LED-level measurement circuit 210) (i.e., load-level calculator circuit) that is configured to determine a level (e.g., current level, light level) of the LED. The LED-level measurement circuit 210 outputs an LED-level ($V_{LED}$) to a duty generation circuit 250 (i.e., duty generation). The duty generation circuit 250 is configured to compare the LED-level ($V_{LED}$) to a reference-level signal ($V_{REF}$). Based on a difference, resulting from the comparison, the duty generation circuit 250 is configured adjust a duty cycle of the PWM signal ($V_{PWM}$) to minimize the difference. Dimming the LED ($D_{LED}$) may be achieved by adjusting the reference-level signal ($V_{REF}$). Additionally, precise dimming control depends, at least in part, on an accurate measurement of a level of the LED (e.g., corresponding to a current of the LED).

In some implementations, the measurement circuit 210 can be configured to determine the load based on a current-sense signal and/or the PWM signal. In some implementations, the load can be determined based on detection of a load current or voltage. In some implementations, the LED-level measurement circuit 210 and the duty generation circuit 250 can collectively be referred to as a duty generator.

The LED-level measurement circuit 210 may directly or indirectly measure the current ($I_{LED}$) of the LED to determine a level of the LED, corresponding to an intensity of the light 101. When an indirect measurement of the LED-level is made, the system 100 may include a current-sense resistor ($R_{CS}$), coupled to a source terminal of the transistor ($Q_{BUCK}$), that is configured to generate a current-sense voltage ($V_{CS}$) corresponding to a current ($I_{CS}$) passed the transistor ($Q_{BUCK}$). By monitoring the current-sense voltage ($V_{CS}$), the LED current in the ON condition (i.e., $Q_{BUCK}$ conducting) may be determined. The LED current ($I_{ID}$), while the transistor 112 is in the ON condition, is equal to the inductor current ($I_L$), which increases as the inductor ($L_{BUCK}$) is charged. The LED current, while the transistor 112 is in the OFF condition, decreases as the inductor ($L_{BUCK}$) is discharged. Depending on a duty cycle of the PWM signal, the LED current may reach zero if the inductor becomes discharged before the PWM cycle repeats (i.e., before the next ON condition).

The LED current changes while the inducted charges and discharges, during ON and OFF portions of a PWM cycle. To simplify the duty cycle generation, a single, representative value of the LED-level (i.e., $V_{LED}$) may obtained for each PWM cycle. For example, the LED-level may correspond to an average LED current during the PWM cycle. Accordingly, the LED-level measurement circuit 210 may be configured to determine a voltage ($V_{CSH}$) that is half of the maximum voltage ($V_{CS,LIM}$) sensed by the current-sense resistor ($R_{CS}$) during an ON cycle of the PWM signal.

The inductor conduction time ($T_{COND}$) is the time during a cycle time ($T_S$) of the PWM signal during which the LED is illuminated (i.e., the inductor current, $I_{LED}$, is greater than zero). The inductor conduction time (i.e., conduction period) may be calculated as the sum of an ON time ($T_{ON}$) and a discharge time ($T_{DIS}$), such as shown below.

$$T_{COND}=T_{ON}+T_{DIS} \quad (1)$$

The LED-level may be calculated based on $V_{CSH}$ and $T_{COND}$, as shown below.

$$V_{LED}=V_{CSH}\times(T_{COND}/T_S) \quad (2)$$

The LED-level measurement circuit 210 may be configured at each cycle to receive the current-sense voltage from the current-sense resistor $R_{CS}$. Additionally, the LED-measurement circuit 210 may be configured to receive the PWM signal and a drain voltage ($V_D$) of the transistor 112 to determine the inductor conduction time ($T_{COND}$). Because determining the conduction time requires a determination of the discharge time ($T_{DIS}$) while the transistor 112 is OFF (i.e., while $I_{CS}$ is zero), the drain voltage ($V_D$) may be used for sensing of the LED current in the OFF condition. For some duty cycles of the PWM signal, however, the conduction time does not need to be determined based on a sensed drain voltage ($V_D$) because it can be obtained based on knowledge of the PWM signal. In either case, the duty generation circuit 250 may be configured to compare $V_{LED}$ to $V_{REF}$ and based on this comparison determine and control (i.e., adjust) an OFF time ($T_{OFF}$) of the PWM signal so that the duty cycle of the PWM signal is adjusted. For example, $T_{OFF}$ may be adjusted for the next PWM cycle to minimize a difference between $V_{LED}$ and $V_{REF}$ (measured at the next PWM cycle).

The buck converter 110 may have a mode of operation that depends on the duty cycle of the PWM signal. The modes of operation are based on the inductor current ($I_L$) during the PWM cycle. The buck converter 110 operates in a continuous conduction mode (i.e., CCM) if the inductor current does not discharge to zero during a PWM cycle. For example, a PWM signal having a high duty cycle (i.e., a short $T_{OFF}$) can correspond to a CCM. The buck converter 110 operates in a discontinuous conduction mode (i.e., DCM) if the inductor current discharges to zero during the PWM cycle. For example, PWM signal having a low duty cycle (i.e., a long $T_{OFF}$) can correspond to a DCM.

Figure 2B:
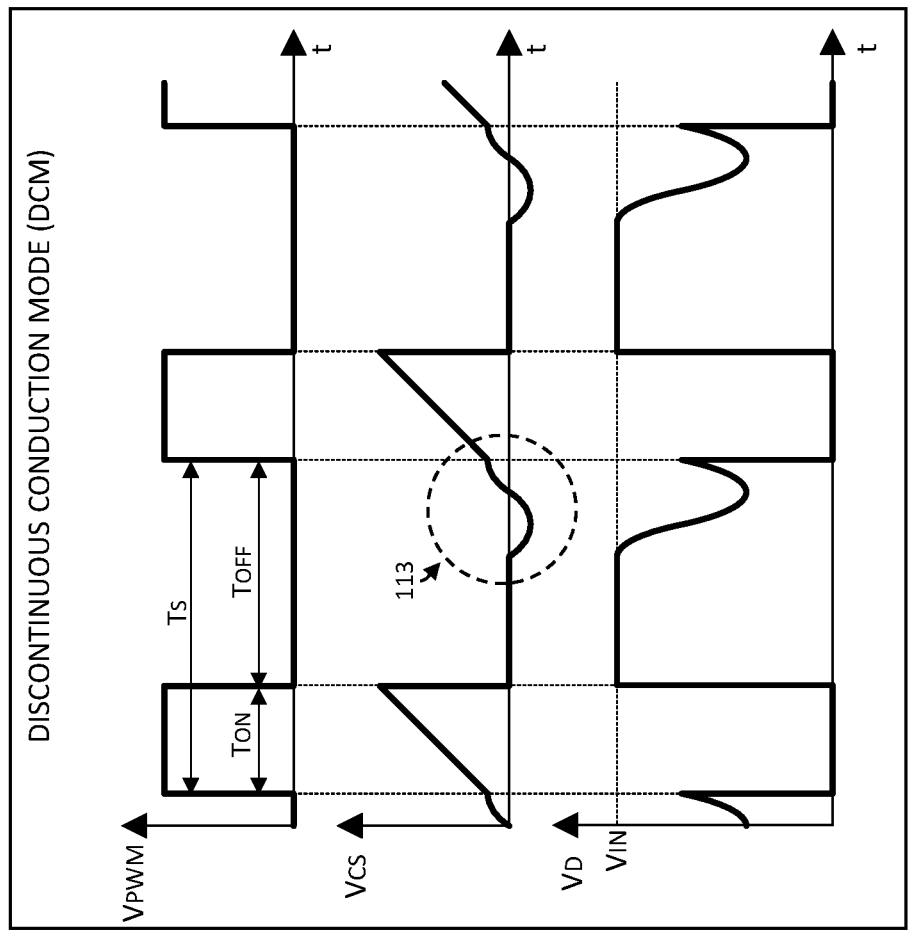
FIG. 2B are time-based graphs of signals associated with the LED system of FIG. 1 operating in a discontinuous conduction mode (DCM) according to a possible implementation of the present disclosure.
Figure 2A:
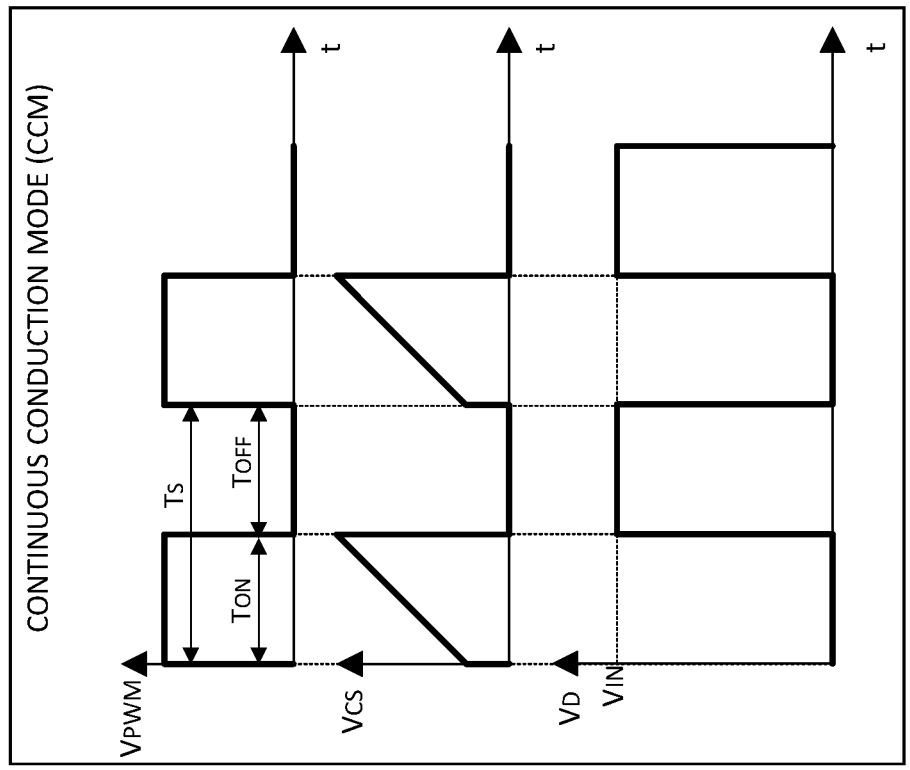
FIG. 2A are time-based graphs of signals associated with the LED system of FIG. 1 operating in a continuous conduction mode (CCM) according to a possible implementation of the present disclosure.

FIGS. 2A and 2B illustrate time-based graphs of signals associated with the system of FIG. 1 for a continuous conduction mode (FIG. 2A) and a discontinuous conduction mode (FIG. 2B). As shown, the PWM signal ($V_{PWM}$) is a binary (ON/OFF) signal having an ON time ($T_{ON}$) and an OFF time ($T_{OFF}$) and a cycle time ($T_S$). A duty cycle of the PWM signal may be determined as $T_{ON}/T_S\times100\%$. The duty cycle of the PWM signal in CCM is higher (i.e., $T_{OFF}$ is shorter) than the duty cycle of the DCM signal (i.e., $T_{OFF}$ is longer).

Also as shown in FIGS. 2A and 2B, the current-sense voltage ($V_{CS}$) (i.e., sensed current signal) corresponding to the transistor current level is shown. In the ON condition (i.e., during $T_{ON}$), the sensed current signal corresponds to the inductor current, $I_L$ (i.e., the LED current, $I_{LED}$). The LED current in CCM is higher than the LED current in DCM. In the OFF condition (i.e., during $T_{OFF}$), the sensed current signal ($V_{CS}$) is ideally zero because the transistor is OFF (i.e., not conducting).

Also as shown in FIGS. 2A and 2B, the sensed drain signal ($V_D$) corresponding to the transistor's drain terminal voltage level (i.e., an inductor, $L_{BUCK}$, voltage level) is shown. In the ON condition (i.e., during $T_{ON}$), the drain voltage ($V_D$) corresponds to a low voltage set by the (conducting) transistor 112 and the current-sense resistor ($R_{CS}$). the input voltage ($V_{IN}$). The LED current in CCM is higher than the LED current in DCM. In the OFF condition (i.e., during $T_{OFF}$), the drain voltage is ideally $V_{IN}$ because the inductor ($L_{BUCK}$) is charged and conducting current.

In CCM the signals of the system maintain their ideal characteristics. In DCM however, the signals exhibit non-ideal characteristics 113. The non-ideal characteristics 113 (e.g., resonant current) can result from the parasitic capacitances that resonate with the inductor ($L_{BUCK}$) to produce ringing when the inductor discharges to zero. The parasitic capacitances may correspond to any of the components in the system, such as for example, the transistor 112 and the buck diode ($D_{BUCK}$).

The resonant ringing in the sensed current ($V_{CS}$) can offset the sensed current voltage ($V_{CS}$) so that a calculation of a half voltage ($V_{CSH}$) is not accurate. For example, at a start time of a PWM cycle, the sensed current voltage ($V_{CS}$) may have a negative value (i.e., a negative resonant current offset, negative), leading the LED-level measurement circuit to overestimate $T_{ON}$, leading to an overestimate of the LED-level ($V_{LED}$). Alternatively, at a start of a PWM cycle, the sensed current voltage ($V_{CS}$) may have a positive value (i.e., a positive resonant current offset, positive offset), leading the LED-level measurement circuit to underestimate $T_{ON}$, leading to an under estimate of the LED-level ($V_{LED}$).

Figure 3:
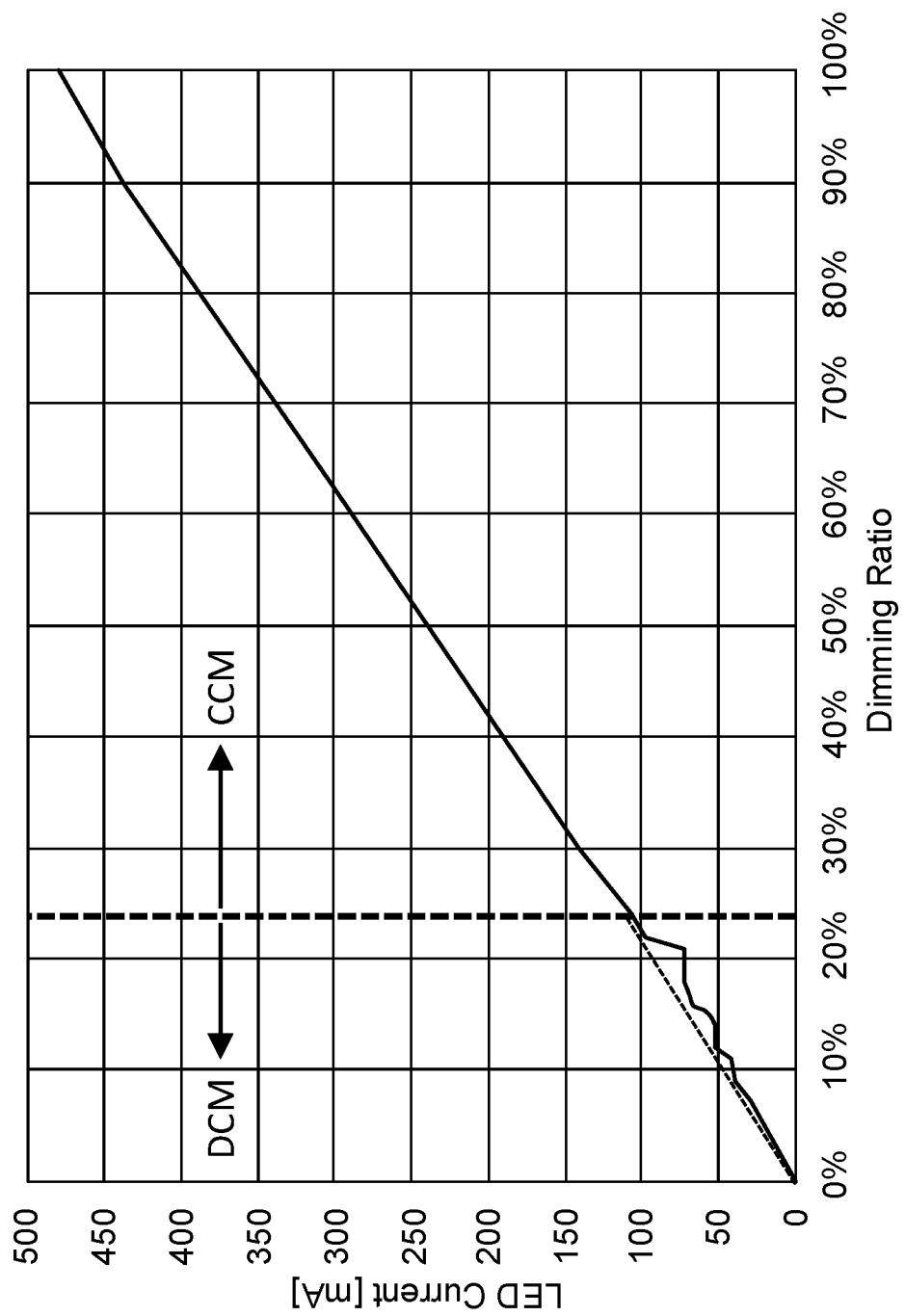
FIG. 3 is a graph of an LED current ($I_{LED}$) versus a dimming ratio according to a possible implementation of the present disclosure.

FIG. 3 illustrates the effects of a resonant current offset on dimming the LED. The figure includes a graph of an LED current ($I_{LED}$) versus a dimming ratio. The dimming ratio is a ratio of the light from an LED to the maximum light available from the LED. For example, a dimming ratio of 100% would be the LED at maximum brightness while a dimming ratio of 0% would be the LED with no light. The dimming ratio may be reduced in the system 100 by reducing a duty cycle of the PWM signal. As the duty cycle is reduce, the system moves from CCM operation to DCM operation. For example, as shown in FIG. 3, the system operates in DCM when the LED-level is below approximately 23% of its maximum value. Ideally, the dimming curve is linear so that an increase in LED current creates a corresponding (e.g., proportional) increase in dimming ratio. The linear dimming curve exists in CCM, but in DCM however, the relationship between LED current and dimming ratio is more complex and departs from the linear relationship (i.e., shown as a dotted line in the DCM portion of the graph). The departure of the dimming curve from linearity is known as dimming distortion. Dimming distortion may be caused, at least, by inaccurate estimations of the LED-level, which as described previously, may be caused by the resonant current offset of $V_{CS}$.

To reduce dimming distortion, the LED system with dimming control can be configured to detect and compensates for resonant current offset. Accordingly, system 100 includes a resonant current offset compensation circuit 270 (i.e., resonant offset compensation). The resonant offset compensation circuit 270 is configured to determine a compensation period $T_{COMP}$ (i.e., compensation time, resonant current offset) that can be used by the LED-level measurement circuit 210 to correct an LED-level measurement that is inaccurate due to a positive or a negative resonant current offset. In particular, the inductor conduction time ($T_{COND}$) may be calculated as the sum of an ON time ($T_{ON}$) and a discharge time ($T_{DIS}$) adjusted by the compensation time, such as shown below.

$$T_{COND} = T_{ON} + T_{DIS} + T_{COMP} \quad (3)$$

The measurement of the load-level includes a compensation period to correct for an offset between the PWM signal and a current-sense signal (corresponding to a current through a transistor of the converter circuit) during the ON portion of the PWM signal. This approach has the advantage of accommodating a positive offset, a negative offset, or no offset by the sign and the magnitude of $T_{COMP}$. The ON time ($T_{ON}$) may be sensed as a period during a PWM cycle in which the sensed current signal ($V_{CS}$) is positive. In CCM, $T_{ON}$ may correspond to (e.g., equal) the period during which the PWM signal is positive. In DCM, however, this may not be the case. The period during which $V_{CS}$ is positive may be longer or shorter than the ON portion of the PWM signal. As discussed, this offset between VCS and the PWM ON cycle is due to resonant effects (e.g., ringing) experienced when the inductor current is completely discharged. Accordingly, this offset may be referred to as a resonant current offset. In some implementations, the offset is a resonant current level (e.g., the level (i.e., amplitude) of ringing (i.e., current ripple) on the sense current ($I_{CS}$) caused by a resonance) at the beginning of the ON portion of the PWM signal in a discontinuous conduction mode (DCM) of the converter circuit.

Accordingly, in some implementations, the compensation period $T_{COMP}$ can be included in, or used for, estimating: Case 1. The load-level; Case 2. Comparison signal from reference and load-level; Case 3. Duty cycle directly. Accordingly, the duty cycle can be adjusted according to a comparison between a reference level and a load level and/or the compensation period.

Figure 4B:
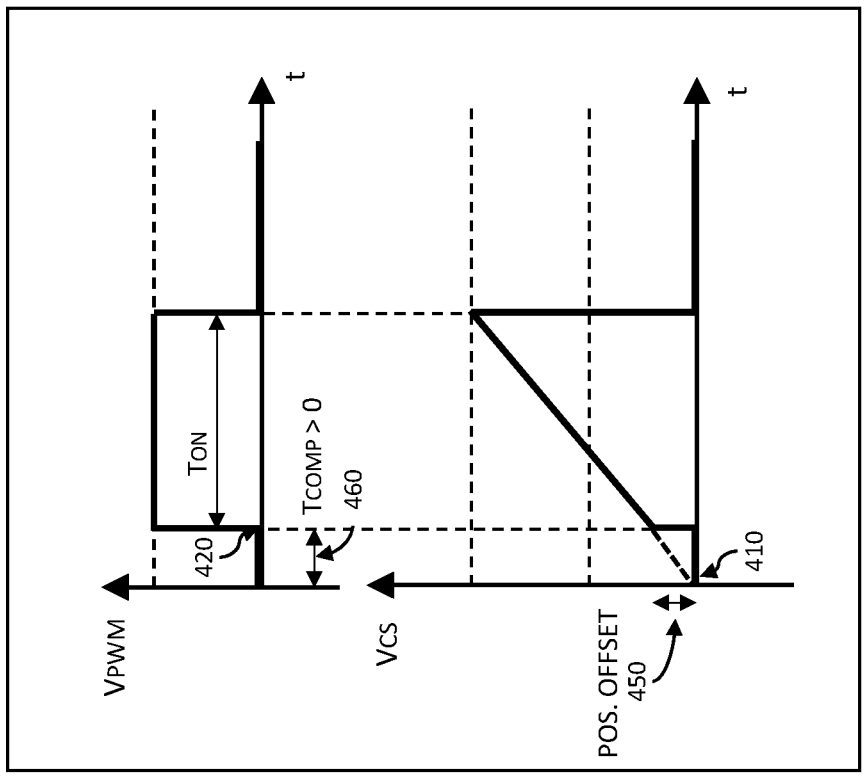
FIG. 4B are time-based graphs of signals associated with the LED system of FIG. 1 illustrating a positive resonant current offset according to a possible implementation of the present disclosure.
Figure 4A:
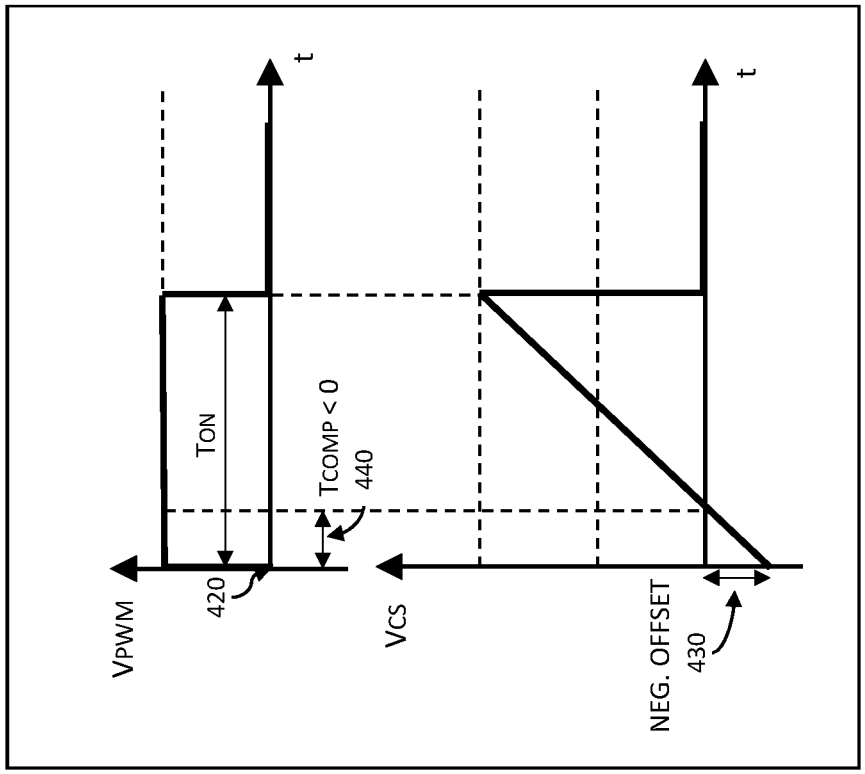
FIG. 4A are time-based graphs of signals associated with the LED system of FIG. 1 illustrating a negative resonant current offset according to a possible implementation of the present disclosure.

FIGS. 4A and 4B illustrate time-based graphs of signals associated with the system of FIG. 1. The sensed current signal ($V_{CS}$) (i.e., the transistor current level) is shown relative to a PWM signal ($V_{PWM}$). In the ON condition (i.e., while the transistor is conducting), the sensed current signal ($V_{CS}$) can serve as a sensed value of the LED current ($I_{LED}$) while the inductor ($L_{BUCK}$) is being charged. As the inductor is charged, the LED current steadily rises from zero. Thus, an accurate measurement of the period during which the LED current is non-zero may include determining precisely the period during which $V_{CS}$ is positive. In DCM, however, a time 410 at which $V_{CS}$ begins steadily rising from zero may not be aligned with a time 420 at the start time of an ON portion of a PWM cycle. If the LED-level measurement circuit 210 is configured to start timing the rise of $V_{CS}$ at the time 420 at the start of an ON portion of a PWM cycle, then the resulting time measurement may be inaccurate by a compensation time ($T_{COMP}$) corresponding to the offset. The inaccuracy may result in either a measurement that is too long or too short which can affect the dimming control, as shown in FIG. 3. The disclosed techniques can be used to increase an accuracy of a load determination (i.e., determined load) (e.g., LED-level measurement).

As shown in FIG. 4A, $V_{CS}$ is negative, by a negative offset 430, at the time 420 at the beginning of $T_{ON}$. The rising current-sense voltage ($V_{CS}$) crosses zero at a time 410 after the time 420 at the beginning $T_{ON}$. Negative $V_{CS}$ values do not correspond to inductor conduction ($T_{COND}$) (i.e., LED illumination) but rather is an artifact from a resonant (i.e., ringing) current. Accordingly, a $T_{COND}$ measurement may need to be reduced by a negative $T_{COMP}$ 440 in order to accurately measure the LED-level.

As shown in FIG. 4B, $V_{CS}$ is positive, by a positive offset 450, at the time 420 at the beginning of $T_{ON}$. The rising current-sense voltage ($V_{CS}$) crosses zero at a time 410 before the time 420 at the beginning $T_{ON}$. All positive VCS values correspond to inductor conduction ($T_{COND}$) (i.e., LED illumination). Accordingly, a $T_{COND}$ measurement may need to be increased by a positive $T_{COMP}$ 460 in order to accurately measure the LED-level.

The current controller 200 of the system 100 includes a resonant offset compensation circuit 270 that is configured to detect the period corresponding to $T_{COMP}$ based on a received PWM signal ($V_{PWM}$) and a current-sense signal ($V_{CS}$). In some conditions (e.g., CCM), the $T_{COMP}$ generated by the circuit 270 can be zero, in which case, no compensation is necessary. In some conditions (e.g., DCM), the $T_{COMP}$ generated by the circuit 270 may have sign based on whether the resonant current offset is positive of negative as shown in FIGS. 4A and 4B.

Figure 5:
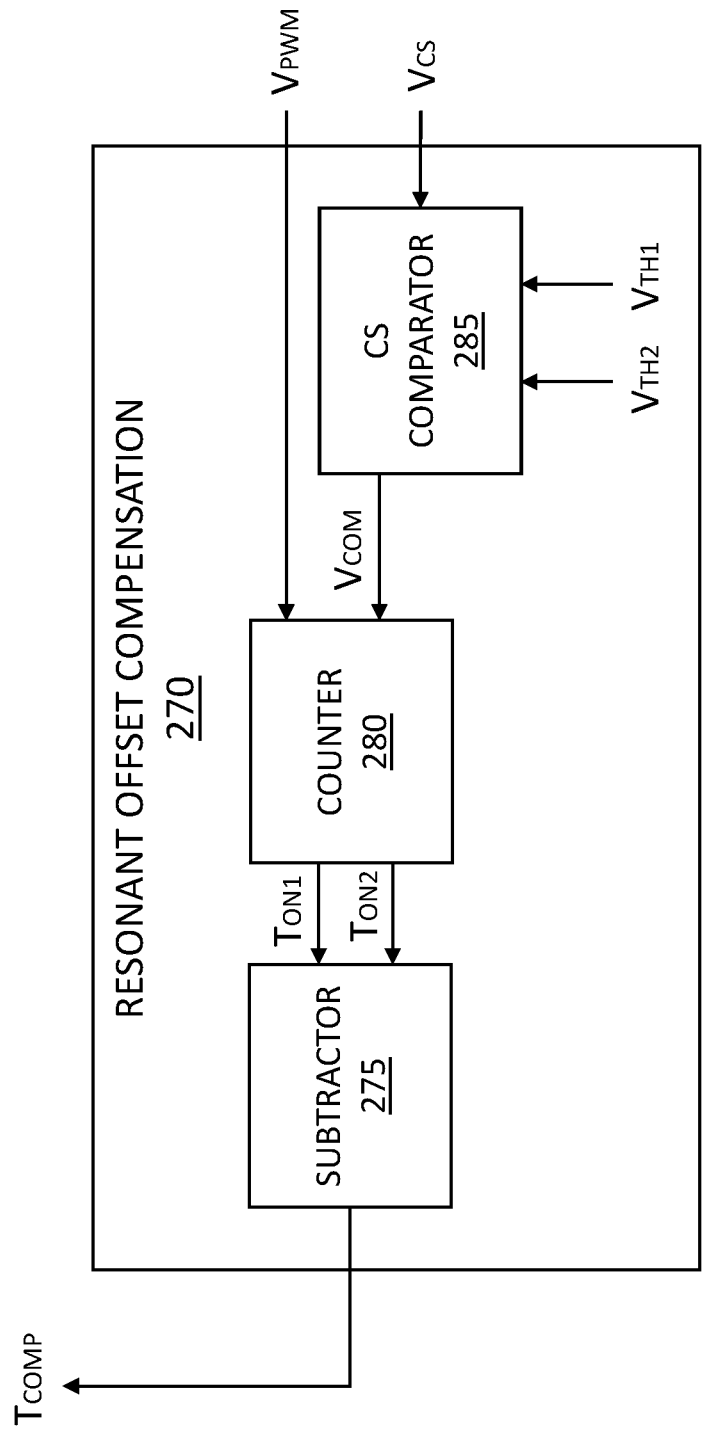
FIG. 5 is a block diagram of a resonant offset compensation circuit according to a possible implementation of the present disclosure.

One possible implementation of the resonant offset compensation circuit 270 is shown in FIG. 5 (i.e., with an orientation arranged to match that of FIG. 1). The resonant offset compensation circuit 270 includes a current-sense comparator 285 (i.e., CS comparator). The current-sense comparator 285 is configured to determine a first time and a second time at which the current-sense voltage ($V_{CS}$) reaches a first voltage and a second voltage, respectively. The trigger signals may be included in a communication signal ($V_{COM}$) that is transmitted to a counter 280 along with the PWM signal ($V_{PWM}$). The counter 280 may be configured to determine a first ON period ($T_{ON1}$) between the start of an ON portion of the PWM signal and first trigger signal and a second ON period ($T_{ON2}$) between the first trigger signal and the second trigger signal. Finally, the resonant offset compensation circuit 270 includes a subtractor circuit 275 (i.e., subtractor) that can compute $T_{COMP}$ as at least the difference between the first ON period ($T_{ON1}$) and the second ON period ($T_{ON2}$).

Figure 6:
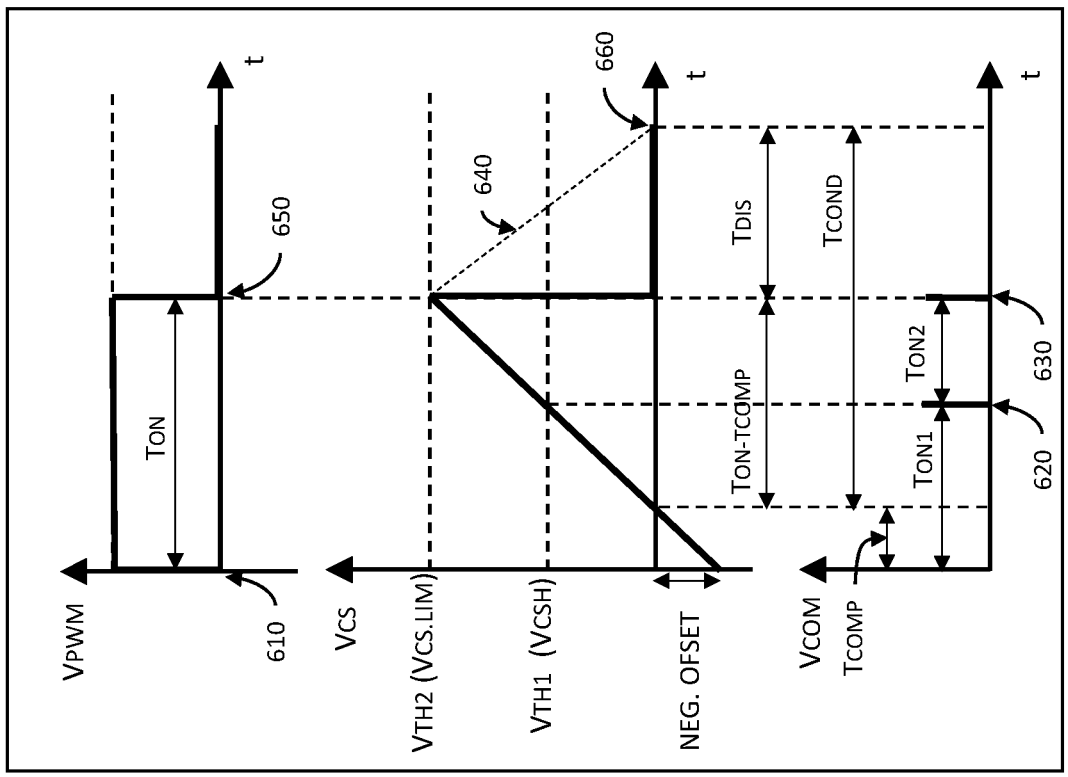
FIG. 6 are time-based graphs of signals associate with the resonant offset compensation circuit of FIG. 5 according to a possible implementation of the present disclosure.

FIG. 6 include time-based graphs of signals associated with an example implementation of the resonant offset compensation circuit 270. The graphs will be described in conjunction with the circuits shown in FIG. 1 and FIG. 5 to help understanding. At a zero-time 610 (i.e., a start time of the ON portion of the PWM cycle) determined by the PWM signal ($V_{PWM}$), the counter 280 is triggered begin timing the first ON period ($T_{ON1}$). During the ON period ($T_{ON}$) of the PWM cycle, the current ($I_{CS}$) through the transistor 112 grows as the inductor ($L_{BUCK}$) in the converter 110 is charged. The current ($I_{CS}$) creates a corresponding current-sense voltage ($V_{CS}$) in the current-sense resistor ($R_{CS}$). When the current-sense voltage ($V_{CS}$) matches or exceeds a first threshold voltage ($V_{TH1}$), a first trigger signal 620 may configure to counter 280 to finish timing and output the first ON period ($T_{ON1}$). Additionally, the first trigger signal 620 may configure the counter 280 to start timing the second ON period ($T_{ON2}$). The first threshold voltage ($V_{TH1}$) may be set to a voltage ($V_{CSH}$) that is half an expected peak voltage ($V_{CS,LIM}$) (i.e., peak current) of the ON period ($T_{ON}$). When the current-sense voltage ($V_{CS}$) matches or exceeds the second threshold voltage (e.g., $V_{TH2}=V_{CS.LIM}$), a second trigger signal 630 may configure the counter 280 to finish timing and output the second ON period ($T_{ON2}$). The subtractor 275 can compute the compensation period ($T_{COMP}$) as the difference between the first ON period and the second ON period (e.g., $T_{COMP}=T_{ON2}-T_{ON1}$), which in this case can be negative because of the negative offset in the $V_{CS}$ signal.

For the implementation shown in FIG. 6, the ON period of the PWM signal ($V_{PWM}$) is $T_{ON}$ but the actual ON time of the LED during the ON portion of the PWM cycle is $T_{ON}+T_{COMP}$, which in this example is shorter due to the negative offset (e.g., caused by the parasitic effects in DCM). Also illustrated in FIG. 6 is the LED current that is sensed as a drain voltage 640 ($V_D$) during an OFF portion of the PWM signal ($V_{PWM}$). In other words, during the OFF portion of the PWM signal, the LED current decreases to zero as the inductor ($L_{BUCK}$) is discharged. The period during which the LED is illuminated while the inductor ($L_{BUCK}$) is discharged is the discharge period ($T_{DIS}$) (i.e., discharge time). The discharge period ($T_{DIS}$) can be determined from the drain voltage ($V_D$) of the transistor 112 instead of the conducted current ($I_{CS}$) because the transistor 112 is configured to conduct no current during the OFF portion of the PWM signal. For example, $T_D$ can be a period defined by a time 650 at which an OFF portion of the PWM cycle begins and a time 660 at which the drain voltage $V_D$ crosses zero. In some implementations, $T_D$ can be a period defined by a time 650 at which an OFF portion of the PWM cycle begins and a time 660 at $V_D$ starts to drop or the inductor current crosses zero. In other words, the discharge time is a period between a start time of the OFF portion of the PWM cycle and a time at which the drain voltage decreases to zero. Accordingly, the LED-level measurement circuit 210 may include a zero-crossing detector circuit (ZCD) configured to determine a time at which the drain voltage $V_D$ starts to drop or the inductor current crosses zero.

Figure 7:
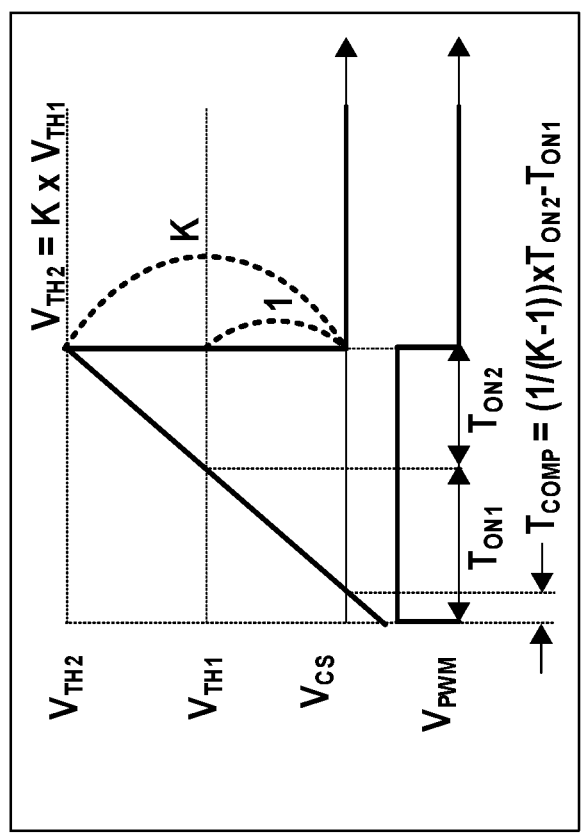
FIG. 7 graphically illustrates the determination of a compensation period ($T_{COMP}$) according to a possible implementation of the present disclosure.

The relationship between the first threshold voltage and the second threshold voltage is not limited to the two-times (K=2) relationship described above. FIG. 7 illustrates a first threshold voltage and a second threshold voltage with respect to a current-sense voltage ($V_{CS}$). The second threshold voltage may proportional by a factor (K) to the first threshold voltage (i.e., $V_{TH2}=K \times V_{TH1}$). In this case, the compensation period may be defined in terms of the factor as shown below.

$$T_{COMP}=(1/(K-1)) \cdot T_{ON2}-T_{ON1} \quad (4)$$

Figure 8B:
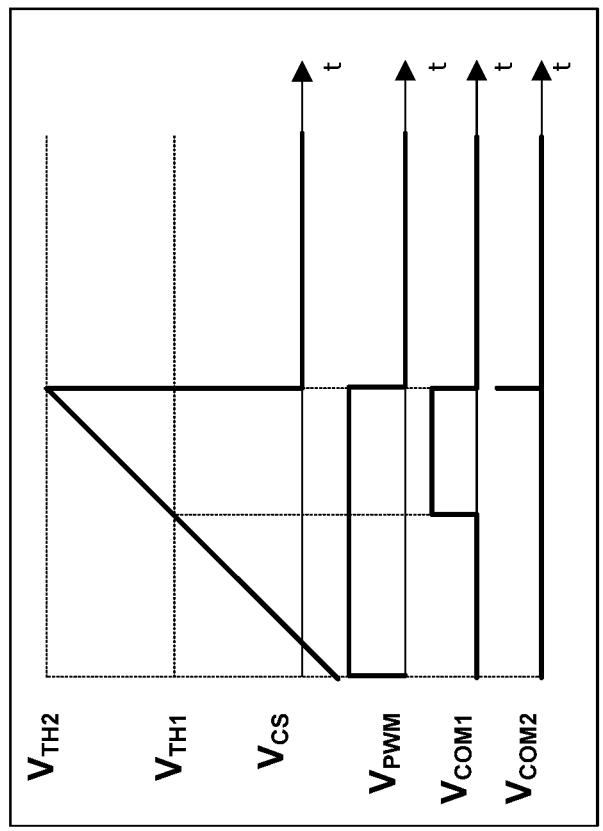
FIG. 8B are time-based signals associated with the CS comparator of FIG. 8A.
Figure 8A:
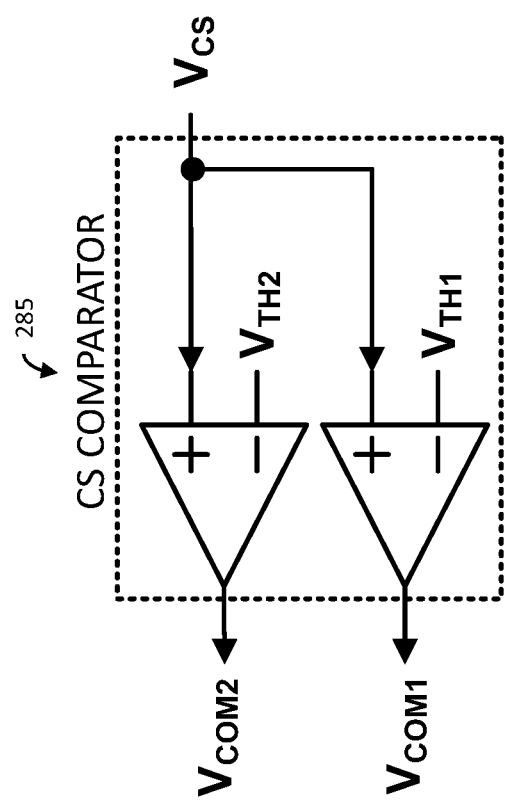
FIG. 8A is a block diagram of a first possible implementation of a current-sense (CS) comparator for a possible implementation of the resonant offset compensation circuit of FIG. 5.

FIG. 8A illustrates a first possible implementation of the CS comparator circuit 285 and FIG. 8B illustrates possible signals associated with the circuit of FIG. 8A. In the implementation, two comparators are used to compare $V_{CS}$ to the first threshold voltage ($V_{TH1}$) and the second threshold voltage ($V_{TH2}$) respectively and each generate a communication signal ($V_{COM1}$, $V_{COM2}$) that can be used to trigger counters to start and/or end counting. The trigger may be a rising edge in the communication signal. For example, the first comparator may generate a first communication signal ($V_{COM1}$) that provides the $T_{ON1}$ counting trigger signal, while the second comparator may generate a second communication signal ($V_{COM2}$) that provides the $T_{ON2}$ counting trigger signal.

Figure 9B:
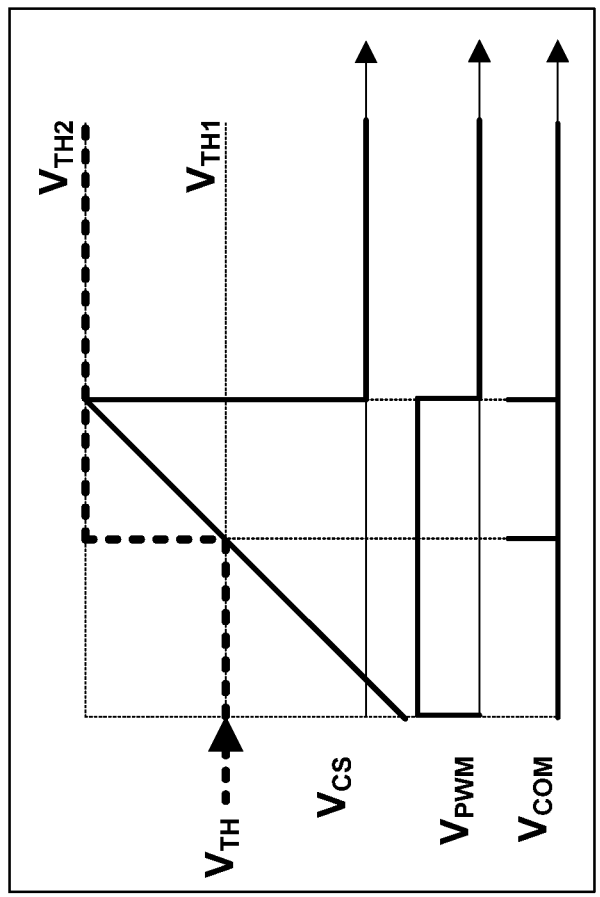
FIG. 9B are time-based signals associated with the CS comparator of FIG. 9A.
Figure 9A:
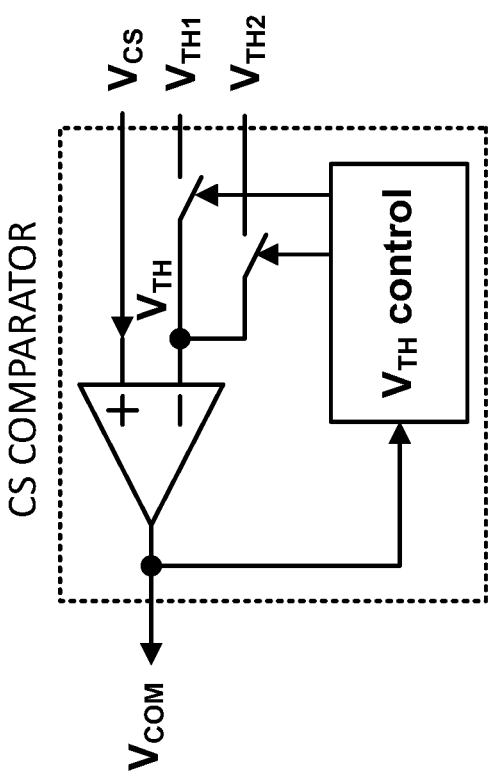
FIG. 9A is a block diagram of a second possible implementation of a current-sense (CS) comparator for a possible implementation of the resonant offset compensation circuit of FIG. 5

FIG. 9A illustrates a second possible implementation of the CS comparator circuit 285 and FIG. 9B illustrates possible signals associated with the circuit of FIG. 9A. In the implementation, one comparator is used to compare $V_{CS}$ to either a first threshold voltage ($V_{TH1}$) or the second threshold voltage ($V_{TH2}$) depending on the state of the $V_{COM}$ signal. The comparator generates a communication signal ($V_{COM}$) that can be used to trigger counters to start and/or end counting. The trigger may be pulses on the communication signal ($V_{COM}$). A first pulse generates the $T_{ON1}$ counting trigger signal and configures switches to change the threshold voltage from $V_{TH1}$ to $V_{TH2}$. The second pulse generates the $T_{ON2}$ counting trigger signal.

Figure 10:
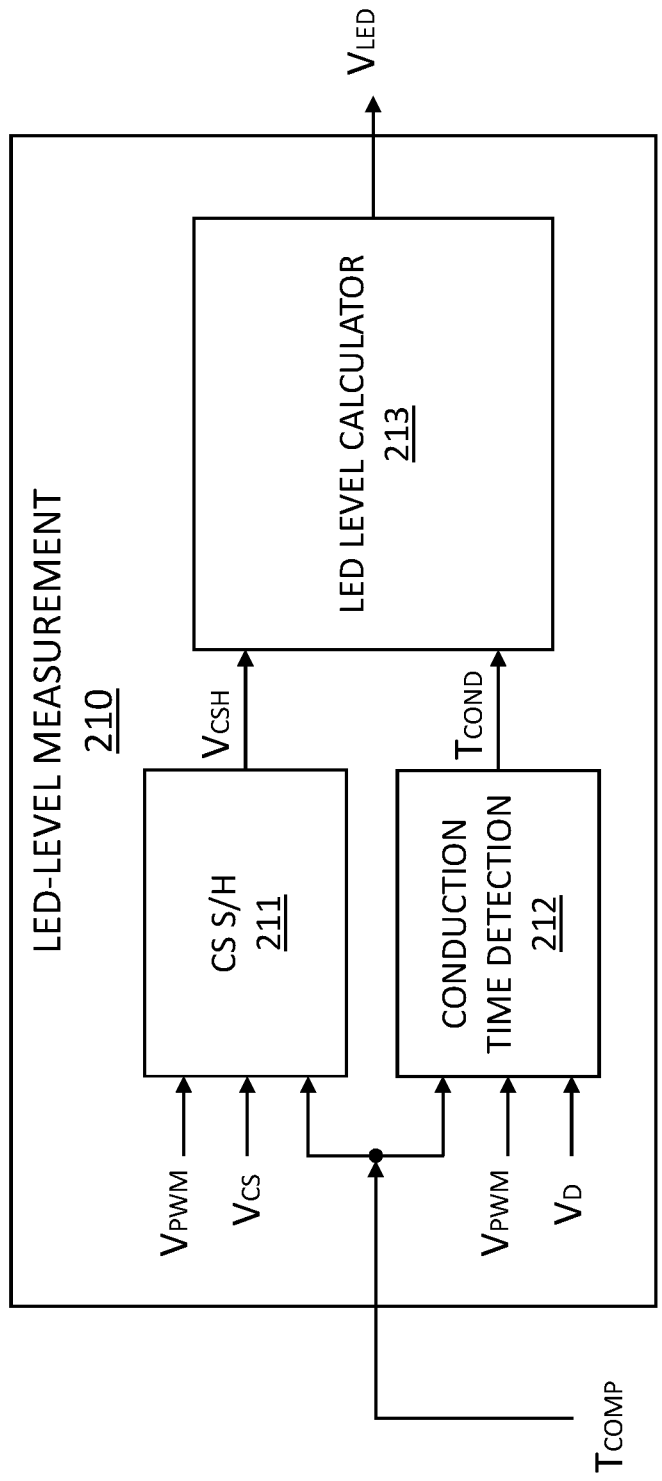
FIG. 10 is a block diagram of a LED-level measurement circuit according to a possible implementation of the present disclosure.

FIG. 10 illustrates a block diagram of a possible implementation of the LED-level measurement circuit 210 of the system 100 of FIG. 1. The LED-level measurement circuit 210 includes a current-sense sample-and-hold circuit 211 (i.e., CS S/H circuit) configured to determine $V_{CS}$ at a sampling time that is determined based on $V_{PWM}$ and $T_{COMP}$. The LED-level measurement circuit 210 further includes a conduction time detection circuit 212 configured to determine the conduction time $T_{COND}$ based on $V_{PWM}$, $V_D$ (e.g., when $V_D$ starts to drop, or the inductor current crosses zero), and $T_{COMP}$. The LED-level measurement circuit 210 further includes a LED-level calculator circuit 213 that generates a LED-level ($V_{LED}$) based on the conduction time ($T_{COND}$) and the sampled current-sense voltage ($V_{CS.SH}$). For example, the LED-level may be calculated as $V_{LED}=V_{CS.SH} \times T_{COND}$.

Figure 11:
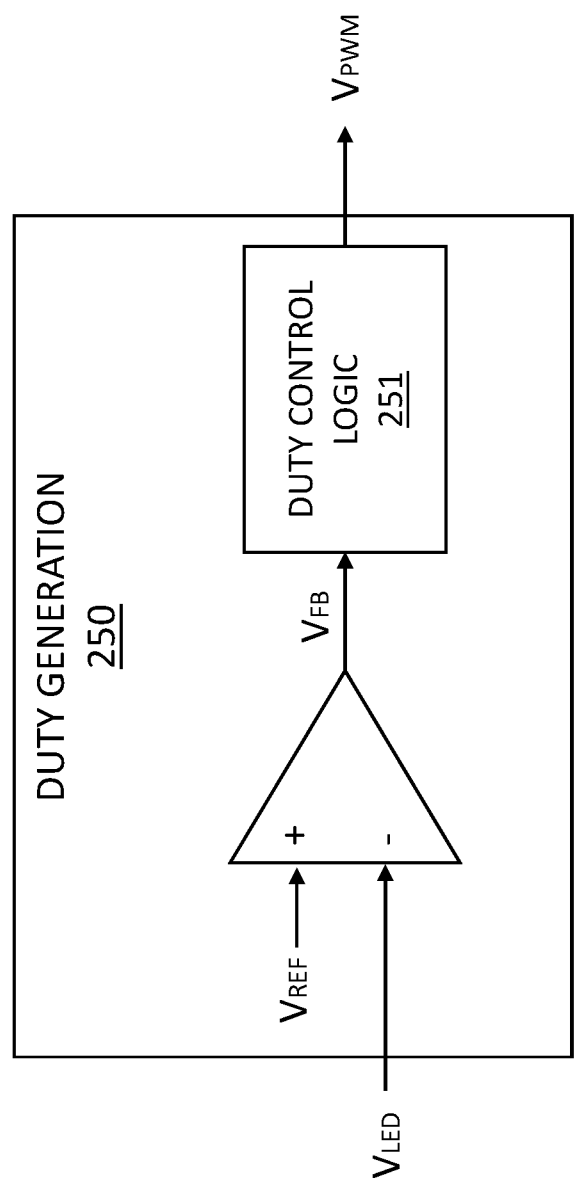
FIG. 11 is a block diagram of a duty generation circuit according to a possible implementation of the present disclosure.

FIG. 11 illustrates a block diagram of a possible implementation of the duty generation circuit 250 of the system 100 of FIG. 1. The circuit 250 includes a differential amplifier configured to generate a feedback signal ($V_{FB}$) corresponding to the difference (i.e., error) between the LED-level ($V_{LED}$) and a reference signal ($V_{REF}$). The reference signal may be received from another circuit coupled the system. For example, the other circuit coupled to the system may be an interface circuit with a control to allow a user to adjust the reference voltage to set an adjustable level of the LED (i.e., dim the LED). The reference signal ($V_{REF}$) can be a set point of a control loop that adjusts the duty cycle that the transistor each PWM cycle so that the difference between the LED-level ($V_{LED}$) and the reference signal ($V_{REF}$) is minimized. The circuit 250 further includes a duty control logic circuit 251 that is configured to transform the feedback signal into a digital (i.e. bi-level) signal that cycles between an ON (e.g., high) level and an OFF (e.g., low) level during a PWM cycle according to a duty cycle. In other words an adjustment to the reference level generates a corresponding adjustment to a current to a load.

Figure 12:
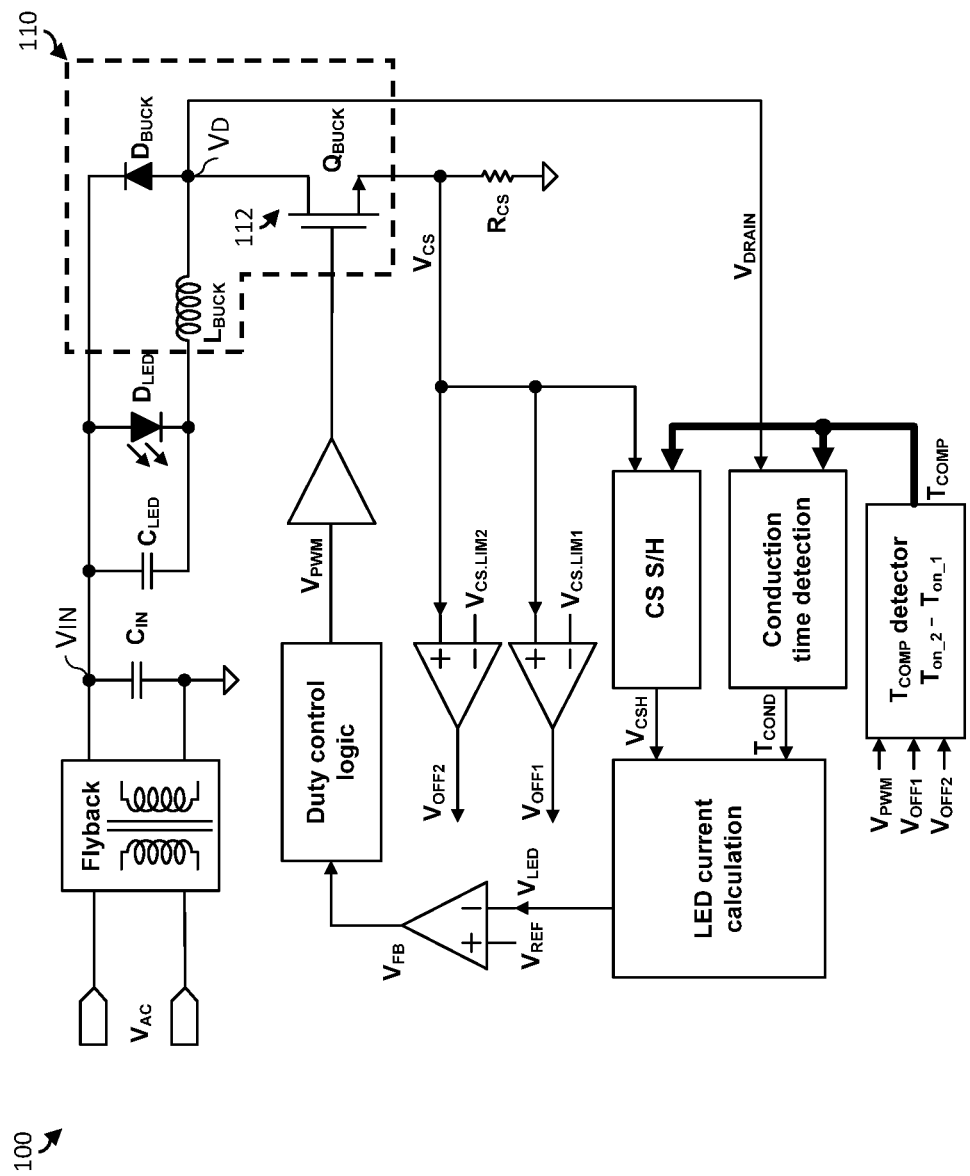
FIG. 12 is a detailed block diagram of an LED system with dimming control according to an implementation of the present disclosure.

FIG. 12, is a possible implementation of the system of FIG. 1 showing additional detail. In operation, the system 100 compares $V_{CS}$ with two reference signals ($V_{CS.LIM1}$ and $V_{CS.LIM2}$). Sampling times can be based on the two outputs of the comparators (i.e., $T_{ON\_1}$, $T_{ON\_2}$) and a resonant current offset time ($T_{COMP}$) is computed as the difference. Next, a current-sense voltage is determined. For example, a half-peak current-sense voltage (i.e., $V_{CSH}$) can be determined by sampling $V_{CS}$ at a sampling time that is adjusted (i.e., compensated) for $T_{COMP}$. Additionally, the inductor conduction time ($T_{COND}$) can be adjusted (i.e., compensated) for by the resonant current offset. In some implementations, the inductor condition time ($T_{COND}$), the LED-level measurement (i.e., the LED calculation) may be computed based on the current-sense signal $V_{CSH}$ and a ratio of the inductor condition time ($T_{COND}$) with the period ($T_S$) of the PWM signal. In some implementations, the LED-level ($V_{ID}$) may then be compared with a reference level $V_{REF}$ (i.e., reference signal) using an amplifier (e.g., an operational transconductance amplifier, OTA). The resulting signal may be used to adjust the duty cycle of the PWM signal ($V_{PWM}$)

by duty control logic. The resulting PWM signal ($V_{PWM}$) may be amplified using a gate driver and coupled to a gate of the transistor ($Q_{BUCK}$).

Figure 13:
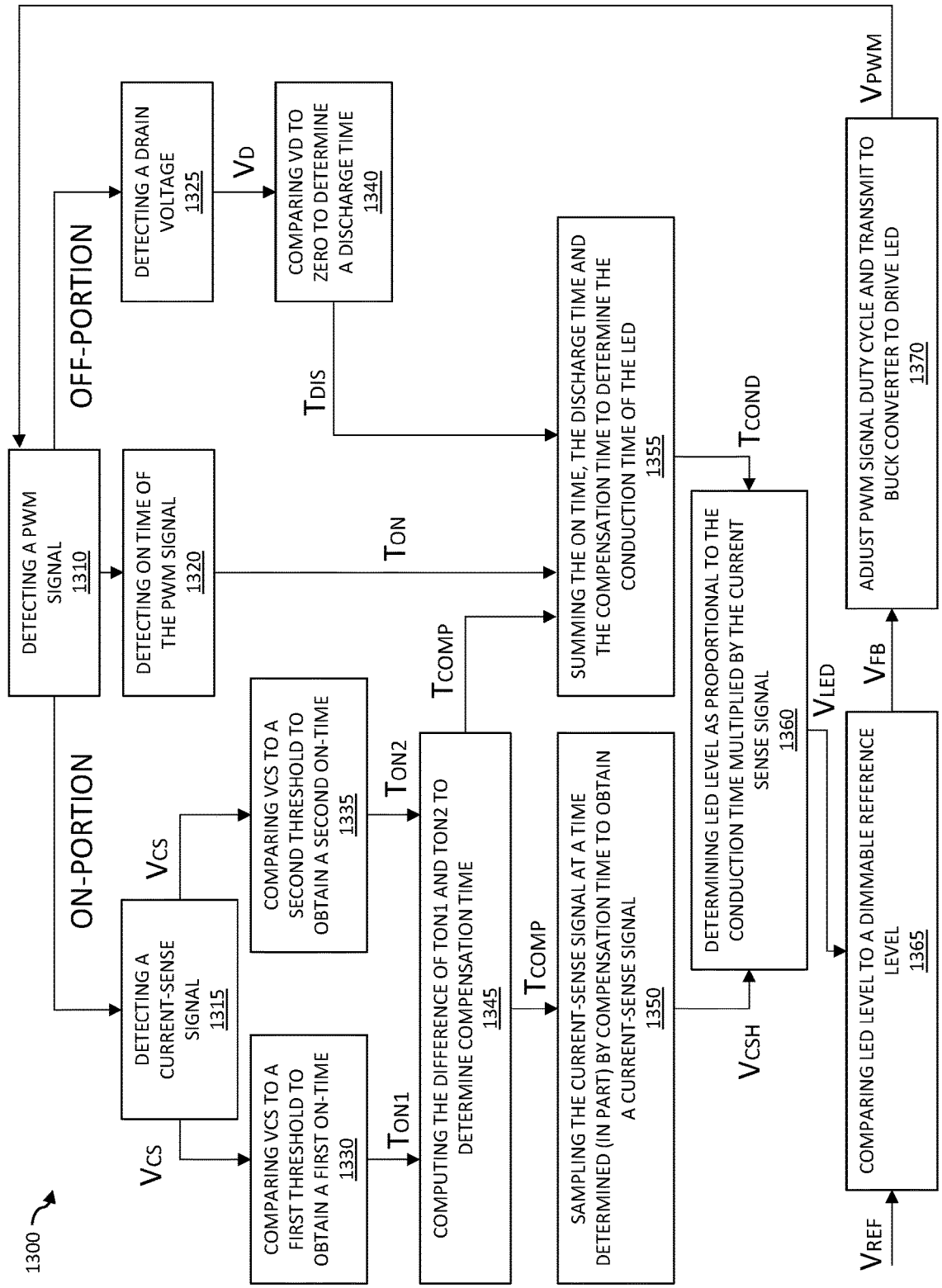
FIG. 13 is a flow chart of a method for driving an LED according to an implementation of the present disclosure.

FIG. 13 graphically depicts a method driving an LED. The method 1300 includes detecting 1310 a PWM signal having an ON-portion and an OFF-portion for controlling the switching of a DC-to-DC converter (e.g., buck converter) so as to generate a (constant) current for the LED at a level that depends on the duty cycle of the PWM signal. At the beginning of the ON-portion of the PWM signal, a current-sense signal (i.e., corresponding to the LED current) is detected 1315. The current-sense signal ($V_{CS}$) increases as an inductor in the converter circuit is charged. In other words, the current-sense signal corresponds to a charging current of the inductor. The increasing $V_{CS}$ is compared to a first threshold to obtain 1330 a first ON-time ($T_{ON1}$) and compared to a second (e.g., higher) threshold to obtain 1335 a second ON-time ($T_{ON2}$). A compensation time may be computed 1345 as the difference of the first ON-time and the second ON-time (e.g., $T_{ON2}-T_{ON1}=T_{COMP}$). The method further includes sampling 1350 the (increasing) current-sense signal at a time determined (at least in part) by the compensation time to obtain a half-peak current-sense voltage ($V_{CSH}$).

In a different branch of the method's flow, the method 1300 includes detecting 1320 an ON time of the PWM signal ($T_{ON}$). Further, at the beginning of the OFF-portion of the PWM signal, a drain voltage (e.g., of the transistor in the converter) may be detected 1325. The drain voltage ($V_D$) decreases as the inductor in the converter circuit is discharged. In other words, the drain voltage corresponds to a discharging current of the inductor. The decreasing $V_D$ can be compared 1340 to a zero voltage (e.g., using a zero-crossing detector, ZCD) to obtain a discharge time (TDB). The method includes summing 1355 the compensation time, the ON time of the PWM signal, and the discharge time to obtain a conduction time ($T_{COND}$) of the LED.

After the half-peak current-sense voltage ($V_{CSH}$) and the conduction time ($T_{COND}$) are computed the method 1300 includes determining 1360 an LED-level ($V_{LED}$) as proportional to the conduction time ($T_{COND}$) multiplied by the half-peak current-sense voltage ($V_{CSH}$). The method further includes comparing 1365 the LED-level ($V_{LED}$) to a dimmable (i.e., adjustable) reference signal ($V_{REF}$) to obtain a feedback signal (VFB) (i.e., error signal) that is used to adjust 1370 a duty cycle of the PWM signal transmitted to the buck converter to drive the LED. This method may be repeated for each cycle of the PWM signal.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation. For example, while the disclosure provides details regarding the application of LED dimming, in which a LED receives current from a buck converter based on a compensated measurement of the LED level, variations could exist. Accordingly, the disclosed approach may be considered more generally as advantageous to any controlled converter topology (e.g., buck, boost, buck-boost) through its generation of a compensation period ($T_{COMP}$) to determine a duty cycle necessary to provide a constant current or voltage to a load.

Figure 14:
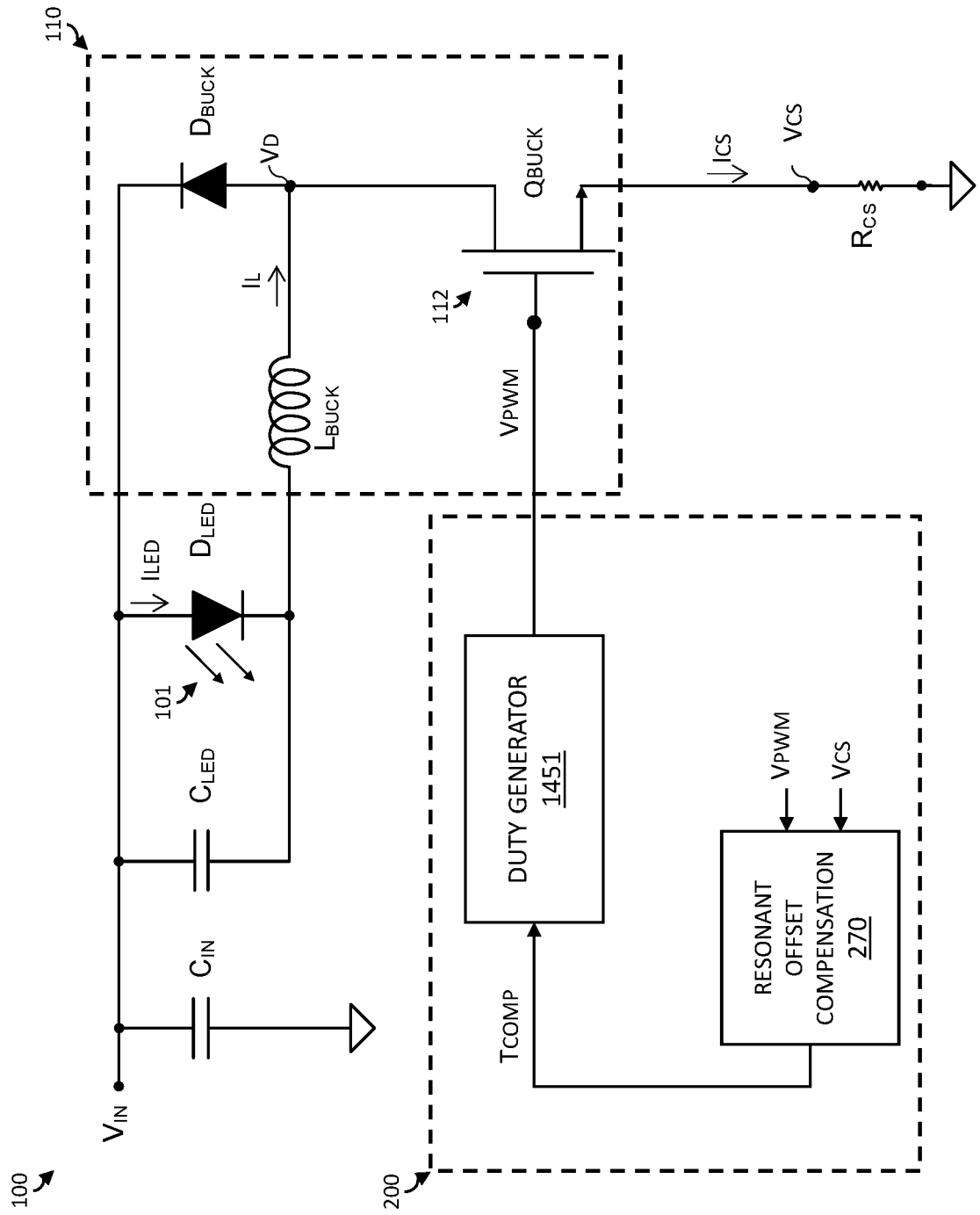
FIGS. 14 and 15 illustrate a variation of the implementations described herein.
Figure 15:
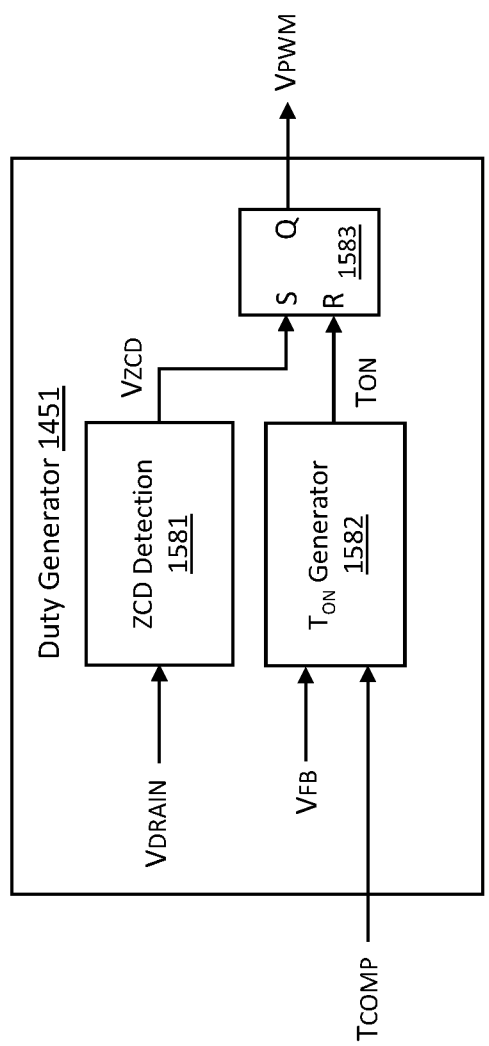

A variation of the implementations described herein is shown in FIGS. 14 and 15. The elements that are the same as those already described above will not be described again in connection with this implementation. In this implementation, the LED-level measurement circuit 210 and the duty generation circuit 250, which can collectively be referred to as a duty generator, are replaced with a duty generator 1451. The duty generator is configured to produce a pulse width modulated signal (i.e., PWM signal, ($V_{PWM}$)) to a control (e.g., gate) terminal of the transistor ($Q_{BUCK}$) to cycle the transistor ON and OFF. The PWM signal ($V_{PWM}$) in this implementation can have at least some of (or all of) the features described above.

The details of the duty generator 1451 associated with the implementation in FIG. 14 are shown in FIG. 15. This implementation can be referred to as a power factor correction (PFC) boost converter implementation. As shown in FIG. 15, the duty generator 1451 includes a ZCD detection circuit 1581, $T_{ON}$ generator 1582, and a flip flop 1583. The flip flop can be a set-reset type flip flop with a set input S and a reset input R. The output Q can be the PWM signal, ($V_{PWM}$). The ZCD detection circuit 1510 can be configured to determine when, for example, $V_D$ starts to drop, or the inductor current crosses zero, and can send a signal $V_{ZCD}$ to set the flip flop (via the set input S). The $T_{ON}$ generator 1582 can be configured to send a signal $T_{ON}$ to the reset input R. The turn-on time $T_{ON}$, in this implementation, is determined based on $V_{FB}$ and $T_{COMP}$, and the turn-off time, in this implementation, is determined based the ZCD signal $V_{ZCD}$. The signal $T_{ON}$, in some implementations can be based on $T_{ON}=K1*V_{FB}-K2*T_{COMP}$, where K1 and K2 are constants.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The invention claimed is:

1. A controller for a power converter, comprising:
a duty generation circuit configured to generate a pulse width modulated signal (PWM signal) based on a comparison of a load-level of a load coupled to the power converter and a reference level, the PWM signal configuring the power converter to supply a current to the load coupled to the power converter, the current having a level corresponding to a duty cycle of the PWM signal;
a measurement circuit coupled to the duty generation circuit and configured to output the load-level to the duty generation circuit, the load-level based on a determination of a conduction period of an inductor of the power converter; and
a resonant offset compensation circuit configured to receive a current-sense signal from the power converter and the PWM signal from the duty generation circuit and configured to determine a compensation period corresponding to an offset between the PWM signal and the current-sense signal, the compensation period used by the measurement circuit to prevent resonant ringing in a discontinuous current mode (DCM) from affecting the determination of the conduction period.

2. The controller for a power converter according to claim 1, wherein:
the controller is coupled to a source terminal of a transistor of the power converter so that when the transistor is turned ON by the PWM signal, the current-sense signal, which corresponds to a charging current of the inductor of the power converter, is coupled to the controller; and wherein:
the controller is coupled to a drain terminal of the transistor of the power converter so that when the transistor is turned OFF by the PWM signal, a drain voltage, which corresponds to a discharging current of the inductor of the power converter, is coupled to the controller.

3. The controller for a power converter according to claim 2, wherein the resonant offset compensation circuit is configured to determine the compensation period based on a comparison of the current-sense signal to a first threshold and a second threshold.

4. The controller for a power converter according to claim 2, wherein the measurement circuit includes a conduction time detection circuit that is configured to determine the conduction period of the inductor as a period corresponding to the charging current and a period corresponding to the discharging current.

5. The controller for a power converter according to claim 4, wherein the measurement circuit is configured to increase or decrease the conduction period according to the compensation period in order to increase an accuracy of the the comparison of the load-level to the load coupled to the power converter and the reference level.

6. The controller for a power converter according to claim 2, wherein the measurement circuit includes a current-sense sample-and-hold circuit that is configured to sample the current-sense signal at a time adjusted by the compensation period.

7. The controller for a power converter according to claim 1, wherein the power converter is a boost converter or a buck converter.

8. The controller for a power converter according to claim 1 wherein the duty generation circuit includes a comparator configured to compare the load-level to the reference level.

9. The controller for a power converter according to claim 8, wherein an adjustment to the reference level generates in a corresponding adjustment to the current to the load, an accuracy of the corresponding adjustment resulting from use of the compensation period to determine the load-level.

* * * * *